(12) United States Patent
Delrot et al.

(10) Patent No.: US 11,872,746 B2
(45) Date of Patent: Jan. 16, 2024

(54) PHOTORESPONSIVE MATERIALS FOR VOLUMETRIC ADDITIVE MANUFACTURING

(71) Applicant: Ecole Polytechnique Federale de Lausanne (EPFL), Lausanne (CH)

(72) Inventors: Paul Delrot, Morges (CH); Damien Loterie, Ecublens (CH); Christophe Moser, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 224 days.

(21) Appl. No.: 17/291,114

(22) PCT Filed: Nov. 5, 2019

(86) PCT No.: PCT/EP2019/080153
§ 371 (c)(1),
(2) Date: May 4, 2021

(87) PCT Pub. No.: WO2020/094593
PCT Pub. Date: May 14, 2020

(65) Prior Publication Data
US 2021/0379819 A1  Dec. 9, 2021

(30) Foreign Application Priority Data

Nov. 6, 2018  (WO) .................. PCT/IB2018/058716

(51) Int. Cl.
*B29C 64/135* (2017.01)
*B33Y 10/00* (2015.01)
(Continued)

(52) U.S. Cl.
CPC .......... *B29C 64/135* (2017.08); *B29C 64/393* (2017.08); *B33Y 10/00* (2014.12);
(Continued)

(58) Field of Classification Search
CPC ........................... G03F 7/0037; B29C 64/135
See application file for complete search history.

(56) References Cited

U.S. PATENT DOCUMENTS 5,344,298 A    9/1994  Hull
6,500,378 B1  12/2002  Smith
(Continued)

FOREIGN PATENT DOCUMENTS

EP    3 333 629 A1    6/2018
WO    2018/208378 A2  11/2018
WO    2019/043529 A1   3/2019

OTHER PUBLICATIONS

T. Baldacchini, "Three-Dimensional Microfabrication Using Two-Photon Polymerization", William Andrew, 2015 See Spc., p. 1.
(Continued)

*Primary Examiner* — Seyed Masoud Malekzadeh
*Assistant Examiner* — Timothy G Hemingway
(74) *Attorney, Agent, or Firm* — Finch & Maloney PLLC

(57) ABSTRACT

Photoresponsive materials for use with a volumetric additive manufacturing system are described herein. Some embodiments of photoresponsive materials described herein include at least one constituent selected from the group consisting of (i) a thiol-containing siloxane prepolymer, (ii) a vinyl-containing siloxane prepolymer, (iii) a reinforcing filler, (iv) a photoinitiator (v) a polymerization inhibitor. Various methods of using the same photoresponsive materials in additive manufacturing processes, such as volumetric additive manufacturing, are also described.

14 Claims, 4 Drawing Sheets

(51) Int. Cl.
  *B33Y 50/02*   (2015.01)
  *B33Y 70/00*   (2020.01)
  *B29C 64/393*  (2017.01)
  *C09D 183/04*  (2006.01)
  *B29C 64/241*  (2017.01)
  *B29K 33/00*   (2006.01)
  *B29K 77/00*   (2006.01)
  *B29K 83/00*   (2006.01)

(52) U.S. Cl.
  CPC ............... *B33Y 50/02* (2014.12); *B33Y 70/00* (2014.12); *C09D 183/04* (2013.01); *B29C 64/241* (2017.08); *B29K 2033/08* (2013.01); *B29K 2077/00* (2013.01); *B29K 2083/00* (2013.01)

(56) References Cited

U.S. PATENT DOCUMENTS

| | | | |
|---|---|---|---|
| 7,368,484 B2 * | 5/2008 | Levy | ............ C08L 1/14 522/74 |
| 10,016,938 B2 | 7/2018 | DeSimone et al. | |
| 2018/0194080 A1 * | 7/2018 | El-Siblani | .............. B33Y 50/02 |
| 2018/0207863 A1 * | 7/2018 | Porter | .................... B29C 64/40 |
| 2020/0122140 A1 * | 4/2020 | Zhang | ..................... G03F 7/00 |
| 2020/0332066 A1 * | 10/2020 | Kao | ...................... B29C 64/124 |

OTHER PUBLICATIONS

T. J. Walling et al., "Click chemistry stereolithography for soft robots that self-heal", Journal of Materials Chemistry B 5, 2017, pp. 6249-6255 See Spc. Page 2.

S.C. Ligon et al., "Polymers for 3D Printing and Customized Additive Manufacturing", Chem. Rev. 117, 2017 pp. 10212-10290 See Spc., p. 2.

B. Kelly et al., "Computed Axial Lithography (CAL): Toward Single Step 3D Printing of Arbitrary Geometries", May 16, 2017 (https://arxiv.org/pdf/1705.05893.pdf) See International Search.

International Search Report Corresponding to PCT/EP2019/080153 dated Feb. 3, 2020.

Written Opinion Corresponding to PCT/EP2019/080153 dated Feb. 3, 2020.

* cited by examiner

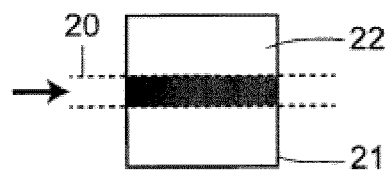 
Figure 2A  Figure 2B
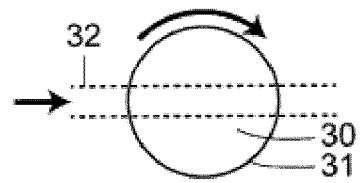 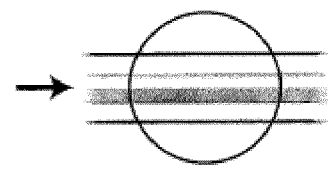
Figure 3A  Figure 3B
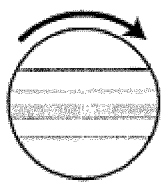 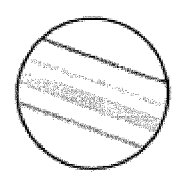
Figure 3C  Figure 3D
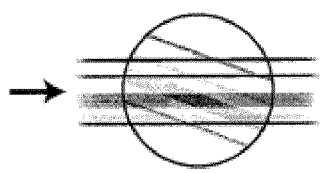 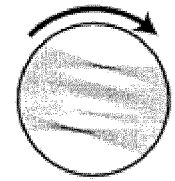
Figure 3E  Figure 3F
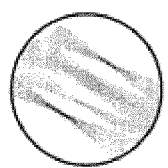 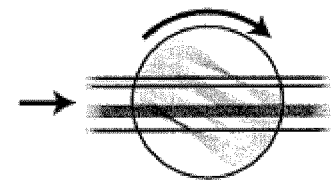
Figure 3G  Figure 3H
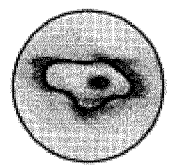 
Figure 3I  Figure 3J

PHOTORESPONSIVE MATERIALS FOR VOLUMETRIC ADDITIVE MANUFACTURING

FIELD OF THE INVENTION

The present invention relates to materials, methods and apparatus for the fabrication of solid and gel-like three-dimensional objects from photoresponsive materials (additive manufacturing). Some aspects of the present invention relate to photoresponsive materials for volumetric additive manufacturing systems wherein the objects are generated by computed tomographic back-projections.

BACKGROUND

In existing light-actuated additive manufacturing systems, a three-dimensional object is fabricated either by pointwise scanning of the object volume or in a layer-by-layer fashion. An example is stereolithography (SLA) (U.S. Pat. No. 5,344,298), where the object is formed one layer at a time by the solidification of a photocurable resin under light irradiation. The successive layers of the object can be defined for example by scanning a laser beam point-by-point in a vat of liquid resin, as suggested in U.S. Pat. No. 5,344,298, or by digital light processing (DLP) technology, as described in U.S. Pat. No. 6,500,378.

In these layer-by-layer manufacturing systems, a strong reactivity and strong light absorption of the liquid photocurable resins (T. Baldacchini, *Three-Dimensional Microfabrication Using Two-Photon Polymerization* (William Andrew, 2015)) are required to obtain an optimal manufacturing resolution in the direction where new layers are cured and added to the growing three-dimensional object. The strong resin absorption prevents the curing light to penetrate deeply in the resin volume and the strong resin reactivity allows the layer to be quickly cured, which results in thin and well-resolved cured layers.

On the other hand, if the resin has a low absorption of the irradiation wavelength, the optical penetration depth of the curing light in the resin container is long, which results in thick cured layers and might even over cure the previously formed layers of the formed object, thus degrading the manufacturing resolution.

Hence, to optimize the manufacturing resolution and obtain the required small optical penetration depth of the curing light into the photocurable resin, a combination of a large amount of photoinitiator (usually 0.5 to 1 weight percent of the resin) and of a light-absorbing dye (usually more than 0.1 weight percent of the resin) is included in the resins used for layer-by-layer additive manufacturing (T. J. Wallin, J. H. Pikul, S. Bodkhe, B. N. Peele, B. C. Mac Murray, D. Therriault, B. W. McEnerney, R. P. Dillon, E. P. Giannelis, and R. F. Shepherd, "Click chemistry stereolithography for soft robots that selfheal," Journal of Materials Chemistry B 5, 6249-6255 (2017)., S. C. Ligon, R. Liska, J. Stampfl, M. Gun", and R. Miilhaupt, "Polymers for 3D Printing and Customized Additive Manufacturing", Chem. Rev. 117, 10212-10290 (2017)).

Moreover, another constraint that existing light-actuated additive manufacturing systems set on the liquid resin is to have a small viscosity (1-100 centipoises) as the refill rate of the vat of photocurable resin and therefore the printing speed of the three-dimensional object is inversely proportional to the resin viscosity (U.S. Pat. No. 10,016,938).

Recently however, a technology has emerged where three-dimensional objects are created volumetrically as opposed to layer-by-layer additive manufacturing (WO 2018/208 378 A2; WO 2019/043 529 A1). This method is based on tomographic projections, similar to those used in medical imaging. In this method, a set of illuminations patterns are computed based on the 3D model of the object. A build volume containing a photosensitive material is then illuminated from many angles with these computed patterns of light, which leads to the solidification of well-defined parts of the photosensitive material into the final object. This tomographic method has advantages in terms of speed and the range of printable materials but creates new challenges on the formulation of photoresponsive materials specifically adapted to this new volumetric additive manufacturing method.

As opposed to prior art on layer-by-layer additive manufacturing systems and methods, volumetric additive manufacturing requires photoresponsive materials with a low optical absorption of the irradiation wavelength and with a high viscosity in order to respectively allow the curing light to propagate in the photosensitive material and to prevent sedimentation of the three-dimensional object during curing.

Consequently, there is a need for improved photoresponsive materials for volumetric additive manufacturing.

SUMMARY OF THE INVENTION

In tomographic volumetric additive manufacturing, the viscosity and optical transparency of the liquid photoresponsive materials used to produce a three-dimensional article is critical to obtaining a high accuracy and high resolution of the printed article with respect to its digital three-dimensional model. We disclose photoresponsive material compositions and methods of using the same to form a three-dimensional article.

In a first aspect, the invention provides a method of printing a three-dimensional article comprising computing a sequence of back-projections describing the three-dimensional article to be formed from different orientation angles of said article, defining a sequence of patterns of curing light using said back-projections, and irradiating with each of said patterns of curing light at the respective corresponding orientation angle and according to the defined sequence a liquid photoresponsive material that is capable of alteration of its material phase upon irradiation by curing light, thereby selectively creating a three-dimensional distribution of alterations within the liquid photoresponsive medium which physically reproduces said three-dimensional article, thereby creating the three-dimensional article. The liquid photoresponsive material comprises a first photoinitiator in an amount such that an optical depth of penetration of the curing light is larger than a fifth of a width of the three-dimensional article. The liquid photoresponsive material has an optical transparency of at least 50% transmission between 350 nm and 450 nm at a thickness of the width of the three-dimensional article. The liquid photoresponsive material has a scattering length larger than the width of the three-dimensional article. The liquid photoresponsive material has a dynamic viscosity between 2000 and 50000 centipoises at a temperature of 25° C. measured with a cone-plate rheometer, and the three-dimensional article is formed in about 1 to 60 seconds.

In a preferred embodiment of the first aspect, the three-dimensional article has a width of about 5 to 500 mm.

In a further preferred embodiment of the first aspect, the liquid photoresponsive material comprises any one or a combination of the items in the following list:

a prepolymer;
a second photo-initiator that interacts with said light or another light source to selectively alter the phase of said liquid photoresponsive material;
a chain extender;
a reactive diluent;
a filler;
a polymerization inhibitor;
a pigment or dye.

In a second aspect, the invention provides a method of printing a three-dimensional article comprising computing a sequence of back-projections describing the three-dimensional article to be formed from different orientation angles of said article, defining a sequence of patterns of curing light using said back-projections, and irradiating with each of said patterns of curing light at the respective corresponding orientation angle and according to the defined sequence a liquid photoresponsive material that is capable of alteration of its material phase upon irradiation by curing light, thereby selectively creating a three-dimensional distribution of alterations within the liquid photoresponsive medium which physically reproduces said three-dimensional article, thereby creating the three-dimensional article. The liquid photoresponsive material is a cyanoacrylate-based formulation such that the printed three-dimensional article has a reduced tackiness and demands fewer post-processing steps than state-of-the-art formulations. The liquid photoresponsive material comprises a photoinitiator in an amount such that an optical depth of penetration of the curing light is larger than a fifth of a width of the three-dimensional article.

The liquid photoresponsive material has an optical transparency of at least 50% transmission between 350 nm and 450 nm at a thickness of the width of the three-dimensional article. The liquid photoresponsive material has a scattering length larger than the width of the three-dimensional article. The liquid photoresponsive material has a dynamic viscosity between 2000 and 50000 centipoises at a temperature of 25° C. measured with a cone-plate rheometer, and the three-dimensional article is formed in about 1 to 60 seconds.

In a further preferred embodiment of the second aspect, the liquid photoresponsive material comprises any one or a combination of the items in the following list:
a cyanoacrylate prepolymer;
an acid stabilizer;
a synergist that interacts with said photo-initiator to selectively alter the phase of said liquid photoresponsive material;
a chain extender;
a reactive diluent;
a filler;
a polymerization inhibitor;
a pigment or dye.

In a third aspect, the invention provides a method of printing a three-dimensional article comprised of a silicone polymer comprising computing a sequence of back-projections describing the three-dimensional article to be formed from different orientation angles of said article, defining a sequence of patterns of curing light using said back-projections, and irradiating with each of said patterns of curing light at the respective corresponding orientation angle and according to the defined sequence a liquid photoresponsive material that is capable of alteration of its material phase upon irradiation by curing light, thereby selectively creating a three-dimensional distribution of alterations within the liquid photoresponsive medium which physically reproduces said three-dimensional article, thereby creating the three-dimensional article, wherein the liquid photoresponsive material comprises a first siloxane polymer comprising a plurality of vinyl groups; and a second siloxane polymer comprising a plurality of thiol groups. The liquid photoresponsive material comprises a first photoinitiator in an amount such that the optical depth of penetration of the curing light is larger than a fifth of a width of the three-dimensional article. The liquid photoresponsive material has an optical transparency of at least 50% transmission between 350 nm and 450 nm at a thickness of the width of the three-dimensional article. The liquid photoresponsive material has a scattering length larger than the width of the three-dimensional article. The liquid photoresponsive material has a dynamic viscosity between 2000 and 50000 centipoises at a temperature of 25° C. measured with a cone-plate rheometer, and the three-dimensional article is formed in about 1 to 60 seconds.

In a further preferred embodiment of the third aspect, the three-dimensional article has a width of about 5 to 500 mm.

In a further preferred embodiment of the third aspect, the liquid photoresponsive material further comprises a plurality of said first siloxane polymer components and/or a plurality of said second siloxane polymer components.

In a further preferred embodiment of the third aspect, the liquid photoresponsive material reacts via a thiol-ene reaction to form the three-dimensional article.

In a further preferred embodiment of the third aspect, the liquid photoresponsive material comprises any one or a combination of the items in the following list:
a prepolymer;
a second photo-initiator that interact with said light or another light source to selectively alter the phase of said liquid photoresponsive material;
a chain extender;
a reactive diluent;
a filler;
a polymerization inhibitor;
a pigment or dye.

In a fourth aspect, the invention provides a method of reducing a tackiness of a three-dimensional article comprised of silicone polymer produced by the method according to the third aspect, comprising immersing the silicone three-dimensional article into a volume of siloxane polymer comprising a plurality of thiol groups and a photoinitiator, and irradiating the volume of siloxane polymer comprising a plurality of thiol groups with light having a wavelength from 350 nm to 450 nm, thereby reducing the tackiness of the three-dimensional article comprised of silicone polymer.

In a further preferred embodiment of the fourth aspect, the method further comprises thermally curing the three-dimensional article comprised of silicone polymer.

In a further preferred embodiment of the fourth aspect, the liquid photosensitive material comprises:
  50 to 90 weight % of a first siloxane polymer having a plurality of vinyl groups and having a molecular weight of 25,000 g/mol to 60,000 g/mol, based on the total weight of the liquid photoresponsive material,
  1 to 20 weight % of a second siloxane polymer having a plurality of vinyl groups and having a molecular weight of 186 g/mol to 6,000 g/mol, based on the total weight of the liquid photoresponsive material,
  1 to 40 weight % of a third siloxane polymer having a plurality of thiol groups and having a molecular weight of 2,000 g/mol to 8,000 g/mol, based on the total weight of the liquid photoresponsive material,
  0.001 to 1 weight % of a photoinitiator, based on the total weight of the liquid photoresponsive material, optionally, 1 to 10 wt. % of a reinforcing filler, based on the total weight of the liquid photoresponsive material.

In a further preferred embodiment of any of the above aspects, the liquid photoresponsive material is controlled in temperature.

In a further preferred embodiment of any of the above aspects, content of said photoresponsive material in any one item of the following list or any combination thereof, is controlled:

oxygen content;
nitrogen content;
carbon dioxide content.

In a fifth aspect, the invention provides a method of printing a three-dimensional article comprising forming a thermoresponsive gel from a liquid photoresponsive material with thermoresponsive gelation properties, computing a sequence of back-projections describing the three-dimensional article to be formed from different orientation angles of said article, defining a sequence of patterns of curing light using said back-projections, and irradiating with each of said patterns of curing light at the respective corresponding orientation angle and according to the defined sequence said photoresponsive-thermoresponsive gel that is capable of alteration of its material phase upon irradiation by curing light, thereby selectively creating a three-dimensional distribution of alterations within the photoresponsive-thermoresponsive gel which physically reproduces said three-dimensional article, thereby creating the three-dimensional article. Said three-dimensional article is optionally separated from the thermoresponsive gel by forming a liquid from the thermoresponsive gel and filtering the three-dimensional article from the liquid thermoresponsive material. The photoresponsive-thermoresponsive gel comprises a first photoinitiator in an amount such that an optical depth of penetration of the curing light is larger than a fifth of a width of the three-dimensional article. The photoresponsive-thermoresponsive gel has an optical transparency of at least 50% transmission between 350 nm and 850 nm at a thickness of the width of the three-dimensional article. The photoresponsive-thermoresponsive gel has a scattering length larger than the width of the three-dimensional article. The photoresponsive-thermoresponsive gel has a liquification or gelation temperature between 0° C. and 40° C., and the three-dimensional article is formed in about 1 to 60 seconds.

In a sixth aspect, the invention provides a three-dimensional article produced by a method as described in the summary section herein above.

BRIEF DESCRIPTION OF THE DRAWINGS

The invention will be better understood through the detailed description of preferred embodiments and in reference to the drawings; wherein

FIGS. 2A-2B are a schematic illustration of fabrication in a static configuration;

FIG. 3A-3J are a schematic illustration of fabrication in a rotating configuration;

DETAILED DESCRIPTION OF THE ILLUSTRATIVE EMBODIMENTS

Figure 1A:
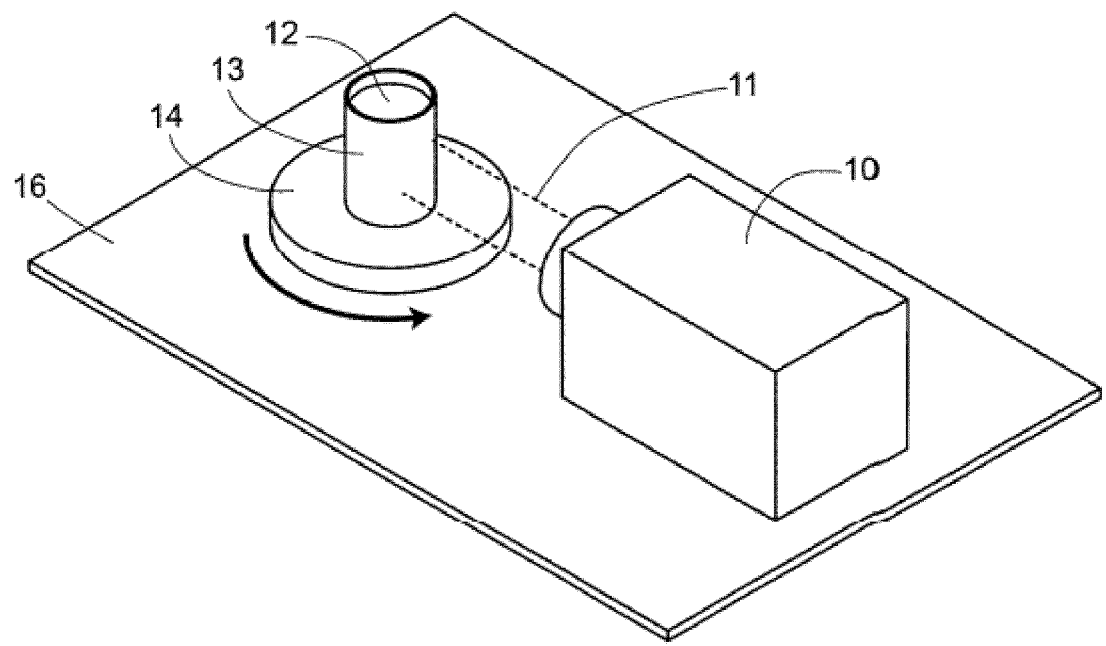
FIG. 1A is a perspective view of one example embodiment of an apparatus of the present invention.

In this section, the invention is disclosed in more detail, with reference to the attached drawings. This section is intended to illustrate particular embodiments of the invention, and should not be interpreted as limiting of the invention. In some cases, the terms "for example" are used as a reminder that the possible embodiments are given by way of example and not by way of limitation.

The present invention provides improved materials for volumetric additive manufacturing by tomographic back-projections and methods of using the same for the fabrication of three-dimensional objects by tomographic back-projections.

The method of volumetric additive manufacturing by tomographic back-projections and of using the same for the fabrication of three-dimensional objects by tomographic back-projections is known and described in detail in WO 2018/208 378 A2 and WO 2019/043 529 A1.

Briefly, and in general terms, the invention comprises representing the three-dimensional object to form by a series of projections along different angles, similarly to the back-projections in computed tomography, and irradiating an optimized photoresponsive material at these angles with light patterns computed from these projections, in order to physically fabricate the object within the photoresponsive material. The photoresponsive material is a liquid material that can alter its material phase in response to irradiation with light. The alterations that the photoresponsive material could possibly undergo when irradiated by light include, but are not limited to, solidification, or gelation. Alternatively, the photoresponsive material is a gel formed from a liquid photoresponsive material with thermoresponsive gelation properties.

The methods described herein provide a means for the alteration of a whole volume of a photoresponsive material in a relatively short time of 1 to 60 s (for example 1s, 10 s, 30 s or 60 s), thus resulting in fast production and more isotropic mechanical properties of the fabricated object. Depending on the particular liquid photoresponsive material that is used for this process, the fabricated object may have properties that include, but are not limited to, softness or elasticity.

In a preferred embodiment of this invention, an optically transparent vessel which defines a build region is provided and filled with the liquid photoresponsive material, and the build region is set into a continuous rotational motion while being concurrently irradiated by a sequence of spatially modulated light patterns (generated as described above) to form an object. The spatially modulated light patterns are irradiated following an optical axis orthogonal to the axis of rotation of the build region. Furthermore, in a preferred embodiment of the invention, the spatially modulated light patterns are two-dimensional and centered on the axis of rotation of the build region. In at least one embodiment of the present invention, the irradiation of the build region by the sequence of spatially modulated light patterns is synchronized with the rotational motion of the build region.

In an alternative preferred embodiment of this invention, an optically transparent vessel which defines a build region is provided and filled with a liquid photoresponsive material with thermoresponsive gelation properties. Before irradiation, a gel is formed from that liquid photoresponsive material with thermoresponsive gelation properties. The formed photoresponsive-thermoresponsive gel has an optical transparency of at least 50% transmission between 350 nm and 850 nm at a thickness of the width of the three-dimensional article. The photoresponsive-thermoresponsive gel has a scattering length larger than the width of the three-dimensional article. The photoresponsive-thermoresponsive gel has a liquification or gelation temperature between 0° C. and 40° C.

In order to produce parts with a high resolution and high accuracy, special care should be given to the optical transparency, viscosity and scattering properties of the photoresponsive material. To accurately produce parts with volumetric additive manufacturing, a volumetric distribution of light dose is deposited within the photosensitive material contained in the build volume. This is achieved by irradiating the whole photosensitive material from a plurality of angles, which requires a good optical transparency of the photosensitive material at the photo-curing wavelength. Thus in at least one embodiment of the present invention, the optical absorption length of the photo-curing radiation is longer than a fifth of the build region width, which implies that the photoinitiator amount in the photosensitive material is such that that the optical absorption length of the photo-curing radiation is longer than a fifth of the build region width.

According to the present invention, the viscosity of the photoresponsive material is comprised between 2000 and 50000 centipoises at a temperature of 25° C. in order to prevent sedimentation of the formed article during the fabrication process.

According to the present invention, the photoresponsive material is optimized to have a scattering length larger than the width of the printed three-dimensional article.

According to the present invention, the liquid photoresponsive material comprises at least one component that is capable of altering its phase (such as solidification or gelation) upon irradiation with light, in the presence a first photoinitiator. Generally, any component that exhibits the above described capability of altering its phase (such as solidification or gelation) upon irradiation with light can be used for the purposes of the invention. Examples are acrylates or methacrylates that are polymerized according to a radical polymerisation mechanism. Such acrylates or methacrylates are known and can used in the form of respective monomers, oligomers or prepolymers.

According to another embodiment of the present invention, the liquid photoresponsive material comprises components that may react with each other according to a thiol-ene reaction. The thiol-ene reaction is known to the skilled person and involves the reaction of a component comprising at least one thiol group with a component comprising at least one carbon-carbon double bond. The thiol-ene reaction proceeds in the presence of a radical initiator (such as a photoinitiator). For the purposes of the present invention, components are used that comprise at least two thiol groups, preferably a plurality of thiol groups (e.g. 2 to 4 thiol groups), and most preferably two thiol groups. These components are reacted with components are used that comprise at least two carbon-carbon double bonds, preferably a plurality of carbon-carbon double bonds (e.g. 2 to 12 carbon-carbon double bonds), and most preferably two carbon-carbon double bonds. Preferably, the carbon-carbon double bonds are vinyl groups.

As an example for suitable components comprising carbon-carbon double bonds, vinyl-terminated siloxane monomers, oligomers or prepolymers may be mentioned. According to a preferred embodiment, vinyl-terminated polydimethylsiloxanes of the following formula may be used:

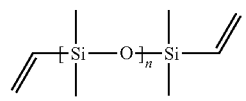

where n can be chosen such that the molecular weight of the polydimethylsiloxane is in a range between 186 and 60000 g/mol (n=1 being the monomer, n=2-10 being an oligomer and n>10 being a prepolymer). Such compounds are commercially available and can be made according to known methods.

According to a preferred embodiment, a combination of a high molecular weight vinyl-terminated polydimethylsiloxane, i.e. with a molecular weight in a range between 25000 and 60000 g/mol, preferably 25000 to 40000 g/mol, and of a lower molecular weight vinyl-terminated polydimethylsiloxane, i.e. with a molecular weight in a range between 186 and 6000 g/mol, preferably 186 and 2000 g/mol, can be used, in order to better adjust the viscosity of the liquid photoresponsive material.

As an example for suitable components comprising thiol groups, organic compounds comprising two terminal SH groups may be mentioned. Also, peptides comprising at least two cysteine moieties may be mentioned. Preferred compounds according to the present invention are SH-group containing siloxane monomers, oligomers or comonomers, more preferably of the following formula:

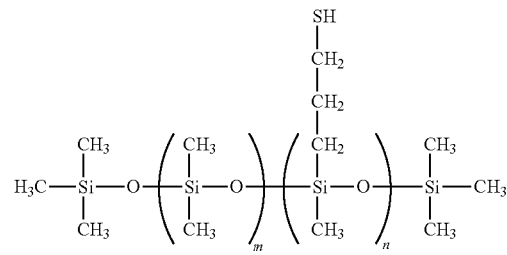

where m and n can be chosen such that the molecular weight of the polydimethylsiloxane is in a range between 370 and 10000 g/mol (m=n=1 being the monomer, m+n=3-10 being an oligomer and m+n>10 being a prepolymer), preferably 2000 to 6000 g/mol. Such compounds are commercially available and can be made according to known methods.

The above photoresponsive compounds are selected in such amounts and combinations that the viscosity of the photoresponsive material is comprised between 2000 and 5000 centipoises at a temperature of 25° C., as outlined above.

In another embodiment of the present invention, the liquid photoresponsive material comprises a cyanoacrylate liquid monomer or oligomer. As an example, methoxyethyl 2-cyanoacrylate, ethoxyethyl 2-cyanoacrylate, trimethylsilyl methyl cyanoacrylate, butyl cyanoacrylate may be mentioned.

In another embodiment of the present invention, a liquid photoresponsive material with thermoresponsive gelation properties may be used. Before irradiation, a gel is formed from that liquid photoresponsive material with thermoresponsive gelation properties. The formed photoresponsive-thermoresponsive gel has an optical transparency of at least 50% transmission between 350 nm and 850 nm at a thickness of the width of the three-dimensional article. The photoresponsive-thermoresponsive gel has a scattering length larger than the width of the three-dimensional article. The photoresponsive-thermoresponsive gel has a liquification or gelation temperature between 0° C. and 40° C. As an example for a suitable liquid photoresponsive material with thermoresponsive gelation properties, gelatine methacrylate (i.e. gelatine functionalized by attaching methacrylic moieties, e.g. by reaction with methacrylic acid anhydride) or collagen methacrylate (i.e. collagen functionalized by attaching methacrylic moieties, e.g. by reaction with methacrylic acid anhydride) may be mentioned. Gel formation may be conducted by heating the material above or cooling it below its gelation temperature, depending on the nature of the material.

The liquid photoresponsive material may further comprise an acid stabilizer to prevent unwanted polymerization of the photoresponsive material when exposed to ambient air. Any acid stabilizer conventionally used in irradiation-curable compositions may be used. As an example, boron trifluoride etherate may be mentioned.

The liquid photoresponsive material may further comprise a synergist that interacts with said photo-initiator to selectively alter the phase of said liquid photoresponsive material. Any synergist conventionally used in irradiation-curable compositions may be used. As an example, ferrocene or thioxanthone derivatives may be mentioned.

If desired, the viscosity of the photoresponsive material can be further adjusted by the addition of a reactive diluent and/or a filler.

Reactive diluents are known and typically comprise liquid monomers or oligomers (such as acrylates) that react under the applied reaction conditions (here irradiation with light). If used, the photoresponsive material of the invention may comprise an amount of reactive diluent of 0-10 wt.-%, preferably 1-5 wt. %, based on the total weight of the photoresponsive material.

Fillers are also known and typically comprise solid particles that are inert under the applied reaction conditions. Examples are fumed silica, talc, bentonite or $TiO_2$. If used, the photoresponsive material of the invention may comprise an amount of filler of 0-10 wt.-%, preferably 1-5 wt.-%, based on the total weight of the photoresponsive material.

According to the present invention, any photoinitiator can be used as first photoinitiator that is capable of initiating a reaction under the conditions of irradiation applied in the present invention. As an example, benzyl ketals, α,α-dialkoxy acetophenones (such as DEAP), α-hydroxy alkylphenones (such as HCPK (Irgacure 184), α-amino alkylphenones (such as MMMP (Irgacure 907) or BDMB (Irgacure 369)), acylphosphine oxides (such as TPO, TPO-L) or benzophenones (such as 1-hydroxycyclohexyl-phenyl ketone (Irgacure 500)) may be mentioned. Also, acylgermane-based photoinitiators such as ivocerin may be mentioned.

As outlined above, according to the present invention said first photoinitiator has to be present in an amount such that an optical depth of penetration of the curing light is larger than a fifth of a width of the three-dimensional article. Preferably, said first photoinitiator is used in an amount from 0.001 to 1 wt.-%, more preferably from 0.01 to 0.5 wt.-% and especially preferred from 0.05 to 0.2 wt.-%, based on the total weight of the photoresponsive material.

As a second photoinitiator, a compound may be used that interacts with said light or another light source to selectively alter the phase of said liquid photoresponsive material. Said second photoinitiator may be selected from the same groups of photoinitiators and in the same amount mentioned above for the first photoinitiator. In a preferred embodiment of the present invention, the photoresponsive material is sensitive to two different radiation wavelengths. Here, the second photoinitiator may be selected as described below.

The liquid photoresponsive material of the present invention may additionally comprise a chain extender. Chain extenders are commonly added to adjust the molecule weight of a polymer by reacting with the end groups of polymer chains and connecting polymer chains. Chain extends are commonly known and may modify the properties of the polymer, e.g. the elasticity. For example, diols such as 1,4-butanediol may be used as chain extenders. The amount in which chain externs are to be used according to the present invention, if at all, depends on the final properties of the material that should be obtained.

The liquid photoresponsive material of the present invention may additionally comprise a polymerisation inhibitor to control polymerisation. An example is hydroquinone. Preferably, said polymerisation inhibitor is used in an amount from 0.001 to 1 wt.-%, more preferably from 0.01 to 0.5 wt.-% and especially preferred from 0.05 to 0.2 wt.-%, based on the total weight of the photoresponsive material.

The liquid photoresponsive material of the present invention may additionally comprise a colorant, which may be either a pigment or a dye. According to the present invention, any colorant conventionally used in printing processes may be used. The colorant is to be selected and used in such an amount according to the present invention that it does not adversely influence the interaction of the liquid photoresponsive material with the irradiation that is applied for altering the phase of the photoresponsive material.

Owing to the continuous rotational motion of the build region and the optimized properties of the photoresponsive material, a local volume of the build region is irradiated by a series of different light intensities. Thus, if the local volume is part of the object to form, the spatially modulated light patterns irradiating the local volume are computed so that the total effective dose absorbed in the local volume is above the phase alteration threshold of the material. Conversely, if the local volume is not part of the object to form, the spatially modulated light patterns irradiating the local volume are computed so that the local dose is below the phase alteration threshold of the material. In a preferred embodiment of the invention, the object is formed after one revolution of the build region. Thus, the phase of a local volume of material is altered from multiple irradiation angles, which confers isotropic mechanical properties to the object.

In at least one embodiment of the invention, the photoresponsive material is sensitive to two different radiation wavelengths.

For example, the photoresponsive material may comprise a photoinhibitor that interacts with a second wavelength of light to selectively hinder the ability of a first wavelength of light to alter the phase of said photoresponsive material. According to an alternative embodiment, the photoresponsive material may comprise a two-stage photo-initiator, such that said photoresponsive material is locally altered upon local simultaneous or successive illumination with first and second wavelengths of light but not altered if locally illuminated with only one of the wavelengths of light.

The rotation speed of the rotating part in the different embodiments may be, but is not limited to, one revolution per second.

In at least one embodiment of this invention, the build region is controlled in temperature. Preferably, the temperature of the build region is controlled to be kept in a range of 0 to 50° C., more preferably 10 to 40° C. For this purpose, conventional heat exchange devices may be provided.

In at least one embodiment of this invention, the humidity of the build region is controlled. Preferably, the humidity of the build region is controlled to be kept in a range of 10 to 95% RH, more preferably 80 to 95% RH for a cell-laden photoresponsive material, and more preferably 20 to 50% RH for a cyanoacrylate-based photoresponsive material. For this purpose, conventional humidity control devices may be provided.

In at least one embodiment of this invention, the content of the atmosphere of the build region is controlled. The atmospheric control can include, but is not limited to, the control of the carbon dioxide content, or of the oxygen content, or of the nitrogen content, or any combination thereof. Depending on the kind of the photoresponsive material, normal atmospheric conditions or inert gas conditions (i.e. oxygen is essentially removed) may be used, for example. In the case the photoresponsive material is loaded with living cells, the content of the atmosphere of the build region may be for example 5 to 10% of carbon dioxide, 0 to 18% of oxygen and 70 to 95% of nitrogen, wherein the percentages are meant to add up to 100%.

Thus, a particular aspect of the invention is a method of forming a three-dimensional article using improved photoresponsive materials for volumetric additive manufacturing. In general, and given the aforementioned elements, the method comprises the steps of:

a. providing an optically transparent vessel which defines the build region;
b. filling the build region with an optimized photoresponsive material for volumetric additive manufacturing, the material being in contact with the walls of the optically transparent vessel;
c. computing one or more sequences of spatially modulated light patterns of one or more radiation wavelengths;
d. setting either the build region or the projection device (a spatial light modulator) into a rotational motion;
e. concurrently irradiating the build region with one or more synchronized spatially modulated light patterns to selectively alter the phase of the photoresponsive material in order to form an object;
f. in the case of the fabrication of a multi-material three-dimensional object, the uncured light-reactive material is removed from the build region, the build region is filled with another light-reactive material and the steps (c), (d), (e) are repeated.

In another embodiment of this particular aspect of the present invention, a three-dimensional article is produced through volumetric additive manufacturing of a photoresponsive material with thermoresponsive gelation properties. In general, and given the aforementioned elements, the method comprises the steps of:

a. providing an optically transparent vessel which defines the build region;
b. filling the build region with a liquid photoresponsive material with thermoresponsive gelation properties, the material being in contact with the walls of the optically transparent vessel;
c. forming a gel from the liquid thermoresponsive-photoresponsive material, by either heating up the liquid photoresponsive material above its gelation temperature or cooling it down below its gelation temperature.
d. computing one or more sequences of spatially modulated light patterns of one or more radiation wavelengths;
e. setting either the build region or the projection device (a spatial light modulator) into a rotational motion;
f. concurrently irradiating the build region with one or more synchronized spatially modulated light patterns to selectively alter the phase of the photoresponsive material in order to form an object;
g. Developing the three-dimensional article by either cooling down the photoresponsive-thermoresponsive gel below its gelation temperature or heating it up above its gelation temperature.
h. in the case of the fabrication of a multi-material three-dimensional object, the uncured light-reactive material is removed from the build region, the build region is filled with another thermoresponsive light-reactive material and the steps (c), (d), (e), (f) and (g) are repeated.

Said three-dimensional article is optionally separated from the thermoresponsive gel by forming a liquid from the thermoresponsive gel and filtering the three-dimensional article from the liquid thermoresponsive material. Formation of a liquid from the thermoresponsive gel may be performed as described above, by heating the gel above its gelation temperature or cooling the gel below its gelation temperature, depending on the kind of material.

1. Preferred Embodiment

Figure 1B:
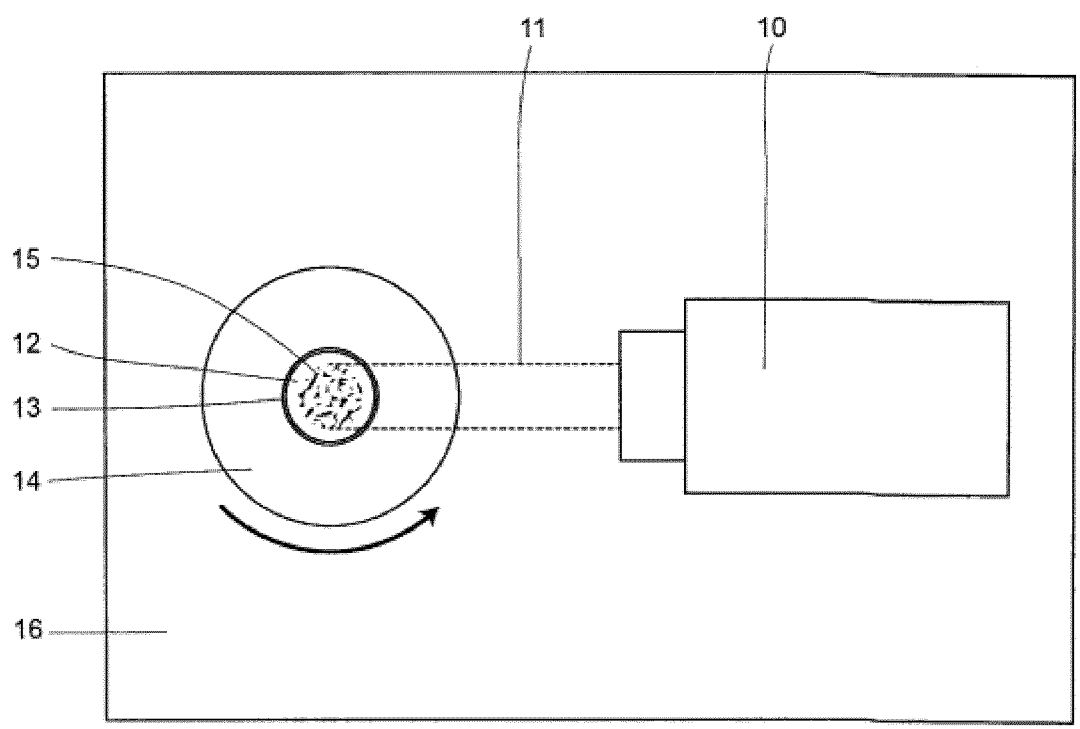
FIG. 1B is a top view of the apparatus of FIG. 1A.

A preferred embodiment of the present invention is shown in FIGS. 1A and 1B. FIG. 1A is a perspective view and FIG. 1B is a top view.

A projection unit 10 generates controllable patterns of light 11, which are directed to a photoresponsive material 12. The liquid photoresponsive material 12 is held inside a container 13 that is optically transparent to the wavelength of the light.

In a preferred embodiment of the present invention, the optical transparency of the liquid photoresponsive material 12 is optimized for volumetric additive manufacturing and it comprises a photoinitiator in an amount such that the optical depth of penetration of the curing light is larger than a fifth of the width of the three-dimensional article to form. Furthermore, the liquid photoresponsive material 12 has an optical transparency of at least 50% transmission between 350 nm and 450 nm at a thickness of the width of the three-dimensional article.

In a preferred embodiment of the present invention, the liquid photoresponsive material 12 is optimized to have a scattering length larger than the width of the three-dimensional article.

In a preferred embodiment of the present invention, the liquid photoresponsive material 12 is optimized to prevent sedimentation of the article to produce and has a dynamic viscosity between 2000 and 50000 centipoises at a temperature of 25° C.

The container 13 is fixed on a rotating platform 14, so that the orientation of the photoresponsive material 12 relative to the beam of light 11 may be controllably varied in one or both rotation directions, either continuously or in incremental steps. As the photoresponsive material 12 is rotated, a pattern (not shown in FIG. 1A) generated by the projection unit 10 is varied so that the desired volumes of the photoresponsive material 12 are being illuminated. In FIG. 1B, the parts of the photoresponsive material 12 that have been altered are represented with black spots 15. The various components of this embodiment are mounted on a support structure 16, whose particular design is not critical and can assume a variety of configurations.

The container 13 and the photoresponsive medium 12 together form the build volume. The container 13 may for example be a cylindrical vial made of glass or plastic or any light-transparent material. The build region may for example be 1 cm wide to 30 cm wide and 1 cm high to 30 cm high.

The optical absorption length at the wavelength of the photo-altering radiation in the photoresponsive material 12 may for example be tuned to be longer than the build volume width.

The projection unit 10 is a device that may generate spatial patterns of light. The projection unit 10 may for example include a directly modulable light source such as an LED array, or it may include a light source with a fixed spatial profile (such as a laser or an LED) combined with a spatial light modulator. The spatial light modulator may consist of galvanometer-scanners, a liquid crystal spatial light modulator, or a digital micromirror device (DMD). The generated patterns of light may be zero-dimensional (spots), one-dimensional (lines), two-dimensional (images), or three-dimensional (holograms). One skilled in the art will understand that the projection unit 10 may incorporate additional optical elements, for example a cylindrical lens to correct for the distortion caused by a cylindrical container, or relay lenses to accurately project the light patterns inside the build volume.

2. Illustration of the Principle Behind the Method

The reason for varying the orientation of the photoresponsive material relative to the projection unit is schematically illustrated in FIG. 2, i.e., FIGS. 2A and 2B. When a beam of light 20 is directed into a static container 21 of photoresponsive material 22, the length over which the photoresponsive medium 22 is affected cannot be controlled precisely. As shown in FIG. 2A, the beam of light 20 affects the photoresponsive material 22 over the entire length of the container 21. This yields a 3D printed object whose two-dimensional profile in a plane transverse to the direction of beam of light 20 can be controlled, but whose depth profile along the direction of propagation of the beam of light 20 is uncontrollable and extends over the entire depth of the container. In this example, the resulting object is shown in FIG. 2B.

The basic principle of the present invention is illustrated in FIG. 3, i.e., FIGS. 3A-3J. In FIG. 3A, a section of the photoresponsive material 30 and its container 31 is shown. The container 31 can be rotated (as indicated by the arrow). A beam of light 32 is directed inside the container 31. Hence, a certain dose of light is deposited inside the photoresponsive material 30. This dose is represented by a grey shaded area in FIG. 3B. The projection of light is interrupted after a short time, such that the photoresponsive material 30 is not yet converted to its alternate form. For example, if the photoresponsive material 30 is a photopolymer material that polymerizes under illumination by a radiation, the projection is halted at an illumination dose that is well below the polymerization threshold. The sample is then rotated as shown in FIG. 3C. The volume that was previously illuminated has now changed orientation with respect to the direction of illumination, as shown in FIG. 3D. The photoresponsive material 30 is then be illuminated from a different direction, as shown in FIG. 3E. In doing so, it is possible to expose certain volumes of the photoresponsive material again (represented with a darker shading in FIG. 3E), while other volumes of the sample receive only a single, low exposure dose (lighter shading in FIG. 3E). After the second exposure, the process can be repeated by rotating the sample more, as shown in FIG. 3F and FIG. 3G, and illuminating the photoresponsive material from a new orientation, as shown in FIG. 3H. The accumulation of all the projections from all the different orientations determines which parts of the photoresponsive material received enough illumination to be converted to an alternate form, as exemplified by the dark shaded area in FIG. 3I, and which parts are insufficiently exposed to be converted, as exemplified by the lighter shaded areas in FIG. 3I. It is understood that the process explained here may also be done with smaller steps of rotation, or even with a continuous rotating motion. After development of the photoresponsive material, a structure can be extracted from the photoresponsive material 3I as illustrated in FIG. 3J. By modulating the light beam 32 in an appropriate fashion while the photoresponsive material 30 rotates, a controlled distribution of light dose is applied to the photoresponsive material 30.

While FIG. 3A to FIG. 3J illustrate only one section of the photoresponsive material 30 for clarity, it is understood that this process may be carried out concurrently for several layers of the photoresponsive material 30. The distribution of the illumination dose can be controlled independently in each layer, thereby allowing three-dimensional structures to be created.

Figure 4:
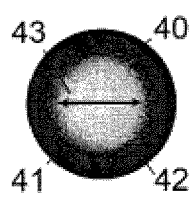
FIG. 4 is a schematic illustration of the effect on the printing method of using a too large amount of photoinitiator in the photoresponsive material.
Figure 5:
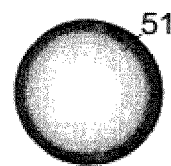
FIG. 5 is a schematic illustration of the effect on the printed three-dimensional object of using a too large amount of photoinitiator in the photoresponsive material.

3. Example 1: Optimizing the Optical Transparency and Photoinitiator Amount in the Photoresponsive Material The reason for optimizing the photoinitiator amount and the optical transparency in the liquid photoresponsive material is schematically illustrated in FIGS. 4 and 5. Starting from the example of the printing process described in FIG. 3 but using a liquid photoresponsive material whose optical transparency and photoinitiator amount is not optimized for volumetric additive manufacturing; we see that if the photosensitive material 40 poured in the container 41 has a photoinitiator amount such that the optical absorption length 42 is much smaller than the width of the article to form 43, the light dose is only absorbed on the side of the build volume.

Thus the developed solid structure 51 will not be true to the digital model, as opposed to the case where the liquid photoresponsive material is optimized in FIG. 3J.

Knowing the absorption coefficient α of the photoinitiator for the photocuring wavelength λ, the concentration c of photoinitiator in the liquid photoresponsive material can be tuned to be longer than a certain distance l using the following formula:

$$c = \frac{1}{\alpha \cdot l}$$

where l should be longer than about a fifth of the width of the three-dimensional article to obtain a good printing resolution.

The same reasoning can be applied to the optical transparency of the photoresponsive material.

Figure 6:
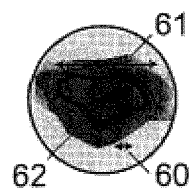
FIG. 6 is a schematic illustration of the effect on printing method of using a too scattering photoresponsive material.
Figure 7:
FIG. 7 is a schematic illustration of the effect on the printed three-dimensional object of using a too scattering photoresponsive material.

4. Example 2: Optimizing the Scattering Properties of the Photoresponsive Material Similarly, the reason for optimizing the scattering properties of the liquid photoresponsive material is schematically illustrated in FIGS. 6 and 7. Starting from the example of the printing process described in FIG. 3 but using a liquid photoresponsive material whose scattering length 60 is smaller than the width 61 of the article to produce; we see that resulting deposited light dose 62 is smeared out, which results in a produced three-dimensional article not true to the digital model as shown in FIG. 7.

Figure 8:
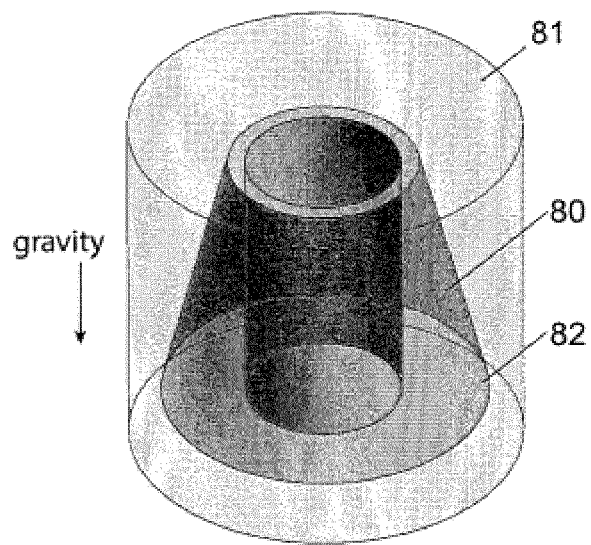
FIG. 8 is a schematic illustration of the effect on the printed three-dimensional object of using an insufficiently viscous photoresponsive material.
Figure 9:
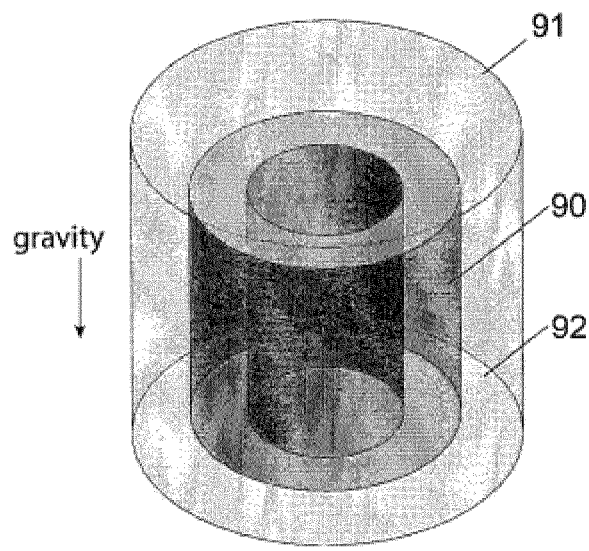
FIG. 9 is a schematic illustration of the effect on the printed three-dimensional object of using a sufficiently viscous photoresponsive material.

5. Example 3: Preventing Sedimentation of the Three-Dimensional Article During the Fabrication Process Similarly, the reason for optimizing the dynamic viscosity of the liquid photoresponsive material is schematically illustrated in FIGS. 8 and 9. As illustrated in FIG. 8, if a low viscosity photoresponsive material 80 poured in a container 81 is used to produce a cylindrical structure, during the time of the printing process, the cured structure 82 will start sedimenting, thus not resulting in cylindrical structure.

On the other hand, the sedimentation speed can be reduced to produce for example, an accurate cylindrical structure 90 by using a high viscosity photoresponsive material 91 in a container 92.

Knowing the density $\rho_{solid}$ of the cured material, the density of the liquid photoresponsive material $\rho_{ink}$, the gravitational acceleration g, the dynamic viscosity of the liquid photoresponsive material $\eta$ and the width of the article to produce L, the sedimentation speed v is:

$$v = \frac{(\rho_{solid} - \rho_{ink})gL^2}{18\eta}$$

The sedimentation depth D during a fabrication time t is therefore:

$$D = vt$$

Therefore assuming a solid object whose larger details are 2 mm of width and whose density is 1180 kg/m$^3$ is formed in 2 seconds in a liquid photoresponsive material of density 1060 kg/m$^3$, and assuming that a sedimentation depth D lower than 50 μm is targeted, the dynamic viscosity of the liquid responsive material should be higher than 10 Pas.

6. Example 4: Improved Composition of the Photoresponsive Material for Producing Soft Silicone Three-Dimensional Article An example of a liquid photoresponsive material optimized for volumetric additive manufacturing to produce soft silicone surgical models of 5 cm in 15 s is given below:

| | |
|---|---|
| Vinyl-terminated Polydimethylsiloxane 25 kDa (Sigma Aldrich, 433012) | 66.8 wt. % |
| Fumed silica vinyl-terminated polydimethylsiloxane (Gelest, DMS-V31S15) | 3.5 wt. % |
| (Mercaptopropyl)methylsiloxane-Dimethylsiloxane copolymer (Gelest, SMS-022), | 29.63 wt % |
| Ethyl(2,4,6-trimethylbenzoyl)phenylphosphinate (TPO-L), | 0.07 wt. % |

The different components were mixed in a planetary mixer for 15 minutes at 2000 rpm and degassed 20 min at 12 psi prior to the fabrication process.

7. Example 5: Improved Composition of the Photoresponsive Material for Producing Hydrogel Structures An example of the composition of a liquid photoresponsive material optimized for volumetric additive manufacturing to produce soft hydrogel structure 15s is given below:

stirring 0.1 wt. % of calcium sulphate in distilled water
Adding 5 wt % of Polyethylene glycol diacrylate 20 kDa in solution prepared above
Adding Lithium Phenyl(2,4,6-trimethylbenzoyl)phosphinate so that its concentration in the solution is 2.44 mol·m$^{-3}$
Mixing the solution
Adding 1.2 Wt. % of sodium alginate

8. Example 6: Reducing the Tackiness of the Printed Silicone Article

The silicone articles produced through volumetric additive manufacturing and using the liquid photoresponsive material described in Example 4 might be very tacky even after developing them.

An improved post-processing step to reduce the surface tackiness of these articles is to immerse them in, for instance but not limited to, 1 w/v % of Ethyl(2,4,6-trimethylbenzoyl) phenylphosphinate (TPO-L) in a thiol siloxane-crosslinker such as, but not limited to, Gelest, SMS-022.

The article immersed in the aforementioned solution is then irradiated with 100 mW/cm$_2$ of photocuring light at 405 nm for 5 min.

9. Example 7: Reducing the Post-Processing of the Printed Article by Formulating a Cyanoacrylate Resin The acrylic or methacrylic articles produced through volumetric additive manufacturing might be very tacky even after developing them. Improved cyanoacrylate-based formulations to reduce the surface tackiness of these articles are given below:

| Formulation 1 | |
|---|---|
| Methoxyethyl 2-cyanoacrylate | 99.87 wt. % |
| Boron trifluoride etherate | 0.00628 wt. % |
| Ferrocene | 0.02 wt % |
| Ivocerin | 0.1 wt. % |

Formulation 2

| | |
|---|---|
| Ethoxyethyl 2-cyanoacrylate | 99.87 wt. % |
| Boron trifluoride etherate | 0.00628 wt. % |

-continued

|   |   |
|---|---|
| Ferrocene | 0.02 wt % |
| Ivocerin | 0.1 wt. % |

Formulation 3

|   |   |
|---|---|
| Trimethylsilylmethylcyanoacrylate | 99.87 wt. % |
| Boron trifluoride etherate | 0.00628 wt. % |
| Ferrocene | 0.02 wt % |
| Ivocerin | 0.1 wt. % |

Formulation 4

|   |   |
|---|---|
| Butyl cyanoacrylate | 99.87 wt. % |
| Boron trifluoride etherate | 0.00628 wt. % |
| Ferrocene | 0.02 wt % |
| Ivocerin | 0.1 wt. % |

10. Example 8: Thermoresponsive-Photoresponsive Gels for Volumetric Additive Manufacturing Formulations of thermoresponsive-photoresponsive gels for volumetric additive manufacturing are given below:

Formulation 1

|   |   |
|---|---|
| Methacrylated collagen | 10 wt. % |
| Phosphate buffered saline | 90 wt. % |
| Lithium Phenyl (2,4,6-trimethylbenzoyl) phosphinate | 2.44 mol · m$^{-3}$ |

Formulation 2

|   |   |
|---|---|
| Methacrylated Gelatine | 10 wt. % |
| Phosphate buffered saline | 90 wt. % |
| Lithium Phenyl (2,4,6-trimethylbenzoyl) phosphinate | 2.44 mol · m$^{-3}$ |

The invention claimed is:

1. A method of printing a three-dimensional article comprising:
    computing a sequence of back-projections describing the three-dimensional article to be formed from different orientation angles of said article,
    defining a sequence of patterns of curing light using said back-projections, and
    irradiating with each of said patterns of curing light at the respective corresponding orientation angle and according to the defined sequence of patterns of curing light a liquid photoresponsive material, or a thermoresponsive gel formed from a liquid photoresponsive material with thermoresponsive gelation properties, that is capable of alteration of a material phase of the liquid photoresponsive material or the thermoresponsive gel upon irradiation by curing light, thereby selectively creating a three-dimensional distribution of alterations within the liquid photoresponsive material which physically reproduces said three-dimensional article, thereby creating the three-dimensional article, and
    separating said three-dimensional article from the thermoresponsive gel by forming a liquid from the thermoresponsive gel and filtering the three-dimensional article from the liquid thermoresponsive material,
    wherein the liquid photoresponsive material or the thermoresponsive gel comprises a first photoinitiator in an amount such that an optical depth of penetration of the curing light is larger than a fifth of a width of the three-dimensional article,
    the liquid photoresponsive material has an optical transparency of at least 50% transmission between 350 nm and 450 nm at a thickness of the width of the three-dimensional article, or alternatively the thermoresponsive gel has an optical transparency of at least 50% transmission between 350 nm and 850 nm at a thickness of the width of the three-dimensional article,
    the liquid photoresponsive material or the thermoresponsive gel has a scattering length larger than the width of the three-dimensional article,
    the liquid photoresponsive material, at a temperature of 25° C., has a dynamic viscosity between 2000 and 50000 centipoises, or alternatively the thermoresponsive gel has a liquification or gelation temperature between 0° C. and 40° C., and
    the three-dimensional article is formed in about 1 to 60 seconds.

2. The method according to claim 1, wherein said three-dimensional article has a width of about 5 to 500 mm.

3. The method according to claim 1, wherein said liquid photoresponsive material is used, and said liquid photoresponsive material comprises at least one component selected from a list consisting of:
    a prepolymer;
    a second photo-initiator that interacts with said light or another light source to selectively alter the material phase of said liquid photoresponsive material;
    a synergist that interacts with said light or another light source to selectively alter the phase of said liquid photoresponsive material;
    an acid stabilizer;
    a chain extender;
    a reactive diluent;
    a filler;
    a polymerization inhibitor;
    a pigment; or
    a dye.

4. The method according to claim 1, wherein said liquid photoresponsive material is used, and the method comprises the steps of
    a. providing an optically transparent vessel which defines a build region,
    b. filling the build region with said liquid photoresponsive material, such that after filling the liquid photoresponsive material is in contact with a wall of the optically transparent vessel,
    c. computing one or more sequences of spatially modulated light patterns of one or more radiation wavelengths;
    d. setting either the build region or a projection device irradiating said patterns of curing light into a rotational motion;
    e. concurrently irradiating the build region with one or more synchronized spatially modulated light patterns to alter selectively the material phase of the photoresponsive material in order to form an object;
    f. in the case of a formation of a multi-material three-dimensional object, removing an uncured light-reactive material from the build region, filling the build region with another light-reactive material, and repeating the above steps.

5. The method according to claim 1, wherein said liquid photoresponsive material with thermoresponsive gelation properties is used, and the method comprises the steps of a. providing an optically transparent vessel which defines a build region,
b. filling the build region with said liquid photoresponsive material with thermoresponsive gelation properties, such that after filling the material liquid photoresponsive is in contact with a wall of the optically transparent vessel,
c. forming a gel, from said liquid photoresponsive material with thermoresponsive gelation properties, by either heating up the liquid photoresponsive material above its gelation temperature of between 0° C. and 40° C. or cooling it down below its gelation temperature of between 0° C. and 40° C.,
d. computing one or more sequences of spatially modulated light patterns of one or more radiation wavelengths;
e. setting either the build region or a projection device irradiating said patterns of curing light into a rotational motion;
f. concurrently irradiating the build region with one or more synchronized spatially modulated light patterns to selectively alter the phase of the photoresponsive material in order to form an object;
g. developing the three-dimensional article by either cooling down the photoresponsive-thermoresponsive gel below its gelation temperature or heating the photoresponsive-thermoresponsive gel up above its gelation temperature;
h. in the case of the fabrication of a multi-material three-dimensional object, removing an uncured light-reactive material from the build region, filling the build region with another light-reactive material, and repeating the above steps.

6. The method according to claim 1, wherein said liquid photoresponsive material is used, and the three-dimensional article comprises a silicone polymer, and
the liquid photoresponsive material comprises a first siloxane polymer comprising a plurality of vinyl groups; and a second siloxane polymer comprising a plurality of thiol groups.

7. The method of claim 6, wherein said liquid photoresponsive material is used, and the liquid photoresponsive material further comprises a plurality of said first siloxane polymer and/or a plurality of said second siloxane polymer.

8. The method of claim 6, wherein said liquid photoresponsive material is used, and the liquid photoresponsive material reacts, via a thiolene reaction, to form the three-dimensional article.

9. A method of reducing a tackiness of a three-dimensional article comprising a silicone polymer produced by the method of claim 6, the method comprising:
Immersing the silicone three-dimensional article into a volume of siloxane polymer comprising a plurality of thiol groups and a photoinitiator,
irradiating the volume of siloxane polymer comprising a plurality of thiol groups with light having a wavelength from 350 nm to 450 nm, thereby reducing the tackiness of the three-dimensional article comprising the silicone polymer.

10. The method of claim 9, further comprising thermally curing the three-dimensional article comprising the silicone polymer.

11. The method of claim 6, wherein said liquid photoresponsive material is used, and the liquid photosensitive material comprises:
50 to 90 weight % of a first siloxane polymer having a plurality of vinyl groups and having a molecular weight of 25,000 g/mol to 60,000 g/mol, based on the total weight of the liquid photoresponsive material,
1 to 20 weight % of a second siloxane polymer having a plurality of vinyl groups and having a molecular weight of 186 g/mol to 6,000 g/mol, based on the total weight of the liquid photoresponsive material,
1 to 40 weight % of a third siloxane polymer having a plurality of thiol groups and having a molecular weight 2,000 g/mol to 8,000 g/mol, based on the total weight of the liquid photoresponsive material,
0.001 to 1 weight % of a photoinitiator, based on the total weight of the liquid photoresponsive material,
optionally 1 to 10 wt. % of a reinforcing filler, based on the total weight of the liquid photoresponsive material.

12. The method of claim 1, wherein said liquid photoresponsive material is used, and said liquid photoresponsive material is temperature controlled.

13. The method of claim 1, wherein said liquid photoresponsive material is used, and the content in said liquid photoresponsive material of any one of the items in the following list or any combination thereof, is controlled:
oxygen content;
nitrogen content; and
carbon dioxide content.

14. A three-dimensional article produced by a method of claim 1.

* * * * *